United States Patent [19]

Cadée et al.

[11] Patent Number: 4,685,353
[45] Date of Patent: Aug. 11, 1987

[54] TRANSMISSION AND STEERING SYSTEM FOR CROSS-COUNTRY VEHICLE

[75] Inventors: Theodorus P. M. Cadée, Goirle; Siebren C. Van der Veen, Veldhoven; Marten Fluks, Vianen, all of Netherlands

[73] Assignee: Octrooibureau Zuid, Netherlands

[21] Appl. No.: 756,826

[22] Filed: Jul. 19, 1985

[30] Foreign Application Priority Data

Jul. 23, 1984 [NL] Netherlands ............... 8402325

[51] Int. Cl.⁴ .................... F16H 37/00; F16H 37/06
[52] U.S. Cl. ................................. 74/689; 74/720.5
[58] Field of Search ................. 74/689, 720.5, 705, 74/682

[56] References Cited

U.S. PATENT DOCUMENTS

| | | | |
|---|---|---|---|
| 2,332,838 | 10/1943 | Borgward | 74/720.5 X |
| 3,015,971 | 1/1962 | Sauer et al. | 74/720.5 |
| 3,091,132 | 5/1963 | Mayfield et al. | 74/720.5 X |
| 3,133,455 | 5/1964 | White | 74/720.5 |
| 3,178,965 | 4/1965 | Mayfield et al. | 74/720.5 X |
| 3,252,353 | 5/1966 | Von Thuengen | 74/720.5 |
| 3,575,066 | 4/1971 | Livezey et al. | 74/720.5 |
| 4,273,206 | 6/1981 | van der Lely | 74/689 X |

FOREIGN PATENT DOCUMENTS 348613 10/1960 Switzerland .

*Primary Examiner*—Allan Herrmann
*Assistant Examiner*—Dirk Wright
*Attorney, Agent, or Firm*—Cushman, Darby & Cushman

[57] ABSTRACT

Two-sided drive for a cross-country vehicle provided with an engine and a variable main drive with reversal device coupled to two similar planetary gear units of which:
  a. the planet bearers of the units are coupled to the out-going shafts of the propulsion mechanism (chainwheel with tracks);
  b. the sun gears or ring gears are coupled via a shaft and a gear transmission, which shaft (intermediate shaft) can be rotated clock wise or anti clock wise by a variable steering drive which is driven by the engine;
  c. the ring gears or the sun gears are coupled to the main drive, wherein,
    (i) the coupling shaft (5) of both sun gears (5l, 5r) also carry a pulley (2') of a continuously variable drive belt transmission (2);
    (ii) the second pulley (2") of this continuously variable drive belt transmission (2) is connected to the engine (1) via a clutch (12) or a break (13) with reversal device (14);
    (iii) a second variable drive belt transmission (3) is provided which is coupled at one side with the engine (1) and at the other side with the intermediate shaft (4) via the steering differential (11) which shaft can rotate the ring gears of both collecting differentials (6l, 6r) in opposite directions but with the same velocities.

8 Claims, 2 Drawing Figures

TRANSMISSION AND STEERING SYSTEM FOR CROSS-COUNTRY VEHICLE

The invention is related to a two-sided drive for a cross-country vehicle provided with an engine and a variable main drive with reversal device connected to two similar planet gear units, so called, collecting differentials, of which:

a. the planet bearers of the units are connected to the main shafts of the propulsion mechanism (chain-wheel with tracks);

b. the sun gears or ring gears are coupled via an intermediate shaft and a gear system, which intermediate shaft can be rotated clock wise or anti clock wise by a controllable steering drive which is driven by the engine;

c. the ring gears or the sun gears are coupled to the main drive.

The term "coupling of parts" means that the parts are interconnected via a rotatable shaft.

Drive systems as described above are mainly used in cross-country vehicles, such as vehicles with tracks. The purpose of this kind of drives is to make the vehicle steerable by giving the drive means (tracks) a different velocity with respect to each other. The velocities can if desired be in the same direction or opposite to enable the vehicle to turn around its vertical axis.

During the normal forward movement along a straight line the planet gear units, which are each coupled to the chain wheel and the track, are driven with equal rotational velocity by the main drive, which is in the desired position (transmission ratio), either by the ring gear in which case the sun gear is stationary, or by the sun gear in which case the ring gear is stationary.

To steer the vehicle with this rectilinear movement, the sun gears (or in the other embodiment the ring gears) are rotated in opposite directions via a shaft (the so called intermediate shaft) by a gear system.

The intermediate shaft is thereto connected to a controllable hydrostatic steering device driven by the engine and is rotated in the required sense for the turn aimed at.

When the vehicle is at a stand still, which means the situation in which the sun gear (or the ring gear in the other embodiment) is blocked, the rotation of the intermediate shaft will cause, with the help of the steering drive, a counter movement of the planet gear units and thus of the drive means.

It will be evident that the radius of a turn is dependent on the velocity of the vehicle. Dependent on this radius the velocity must be adapted by switching the drive system of the main drive. Although this can take place automatically, this is not stepless. The consequence of switching in steps is that the available power is not always used optimally; the steering of the vehicle in curves neither is optimally smooth. There are further disadvantages connected to the hydrostatic steering for instance the bad efficiency and the annoying noise.

It is an object of the invention to mitigate these disadvantages by the use of means which are known per se. Reference is especially made here to the use in the drive system of a continuously variable drive belt transmission, especially those systems which have metallic V-belts and operate according to the so called pushing principle.

The present invention is characterized by the fact that:

(i) a pulley of a continuously variable drive belt transmission is located on the coupling shaft of both sun gear wheels;

(ii) the second pulley of this continuously variable drive belt transmission is connected via a clutch with a reversal device, with the engine;

(iii) there is a second variable drive belt transmission which is connected on the one side with the engine and on the other side, via a so called steering differential, with the intermediate shaft, which second transmission can give the ring gears of both collecting differentials a rotation in opposite directions.

The reversal of the direction of rotation takes place by the use of an intermediate gear wheel (reference numeral 8' in the drawing).

For a better understanding of the invention this will be discussed with reference to a drawing. For this purpose first the working of the usual, here above described known device will be explained:

The main drive distributes its power over the main drive shafts which are coupled to the ring gears of the collecting differentials. The drive system consists further of a steering drive driven by the engine of the hydrostatical type with the following main functions:

steering of the vehicle by driving in the forward or backward direction;

turning of the vehicle around a vertical axis.

The steering drive system distributes the power over the so called intermediate shaft, which is coupled via reduction systems to the sun gear wheels of the collecting differentials. Each collecting differential drives via the planet gear wheels and the planet bearers respectively the left hand side and the right hand side main shaft of the propulsion mechanism which in turn drive the chain wheels of the tracks.

The main drive is responsible for a smooth drive-off according to a desired characteristic. When driving along a straight line to this end a transmission ratio (acceleration) is chosen which, dependent on the load circumstances takes care of a more or less optimal adaptation of the engine. The load circumstances of the vehicle can be defined as the power required at the wheels (tracks) that is the product of the required tractive force and the velocity.

The power of the engine is distributed to the main drive shaft and, via the collecting differentials, to the out-going shafts. In this situation the sun gear wheels are not rotating because the steering drive system does not receive power from the engine.

When making a turn the steering drive system receives power from the engine. Independent of sense of rotation of the intermediate shaft the sun gear gear wheels of the collecting differentials will obtain, via reduction systems, an equal but opposite velocity of rotation. Because the main drive system gives the ring gears of the collecting differentials a rotational velocity in the same direction an increase in velocity will now take place at one of the out-going shafts, which is equal to a decrease of rotational velocity of the other out-going shaft. In dependence on the sense of rotation of the intermediate shaft and the main shaft turns to the left or to the right can now be carried out whether in the forward or the backward direction. The magnitude of the increase or decrease of the velocity also determines the turning circle of the curve.

Turning of the vehicle around its vertical axis is possible by applying the power of the engine to the out-going axis only via the steering drive unit, the reductions and the collecting differentials. In this situation the main driving shaft is not rotating. Dependent on the direction of turning and the velocity of the intermediate shaft one out-going shaft will get an equal but opposite velocity of rotation with respect to the other out-going shaft and thus a left hand of right hand turn can be carried out.

The drive system according to the invention works in a similar way as here above described for the prior art. As will be shown with reference to the accompanying figures, the mechanical lay-out however is completely different in order to optimilize the circumstances of use as will be set out here under.

Figure 1:
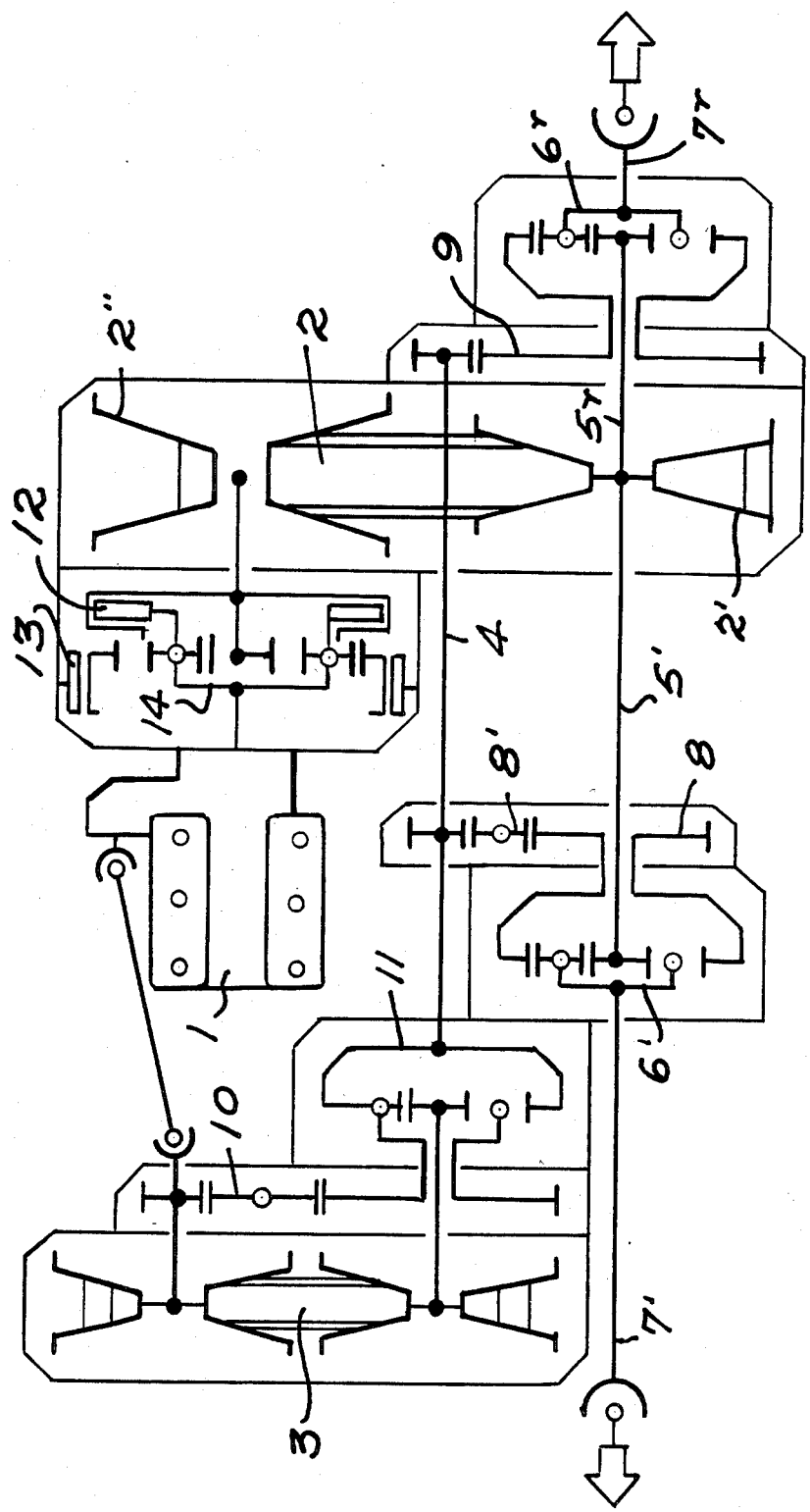
FIG. 1 is a schematic representation of a first embodiment of a transmission and steering system in accordance with the present invention.

The schematically represented drive system consists of a main variator 2 driven by the engine 1 and provided with a reversal clutch group 14 and a drive-off clutch 12 (for driving off in the forward direction) and the reverse-break 13 making a backward drive-off possible.

The following main conditions are fulfilled:
starting/drive-off according to a certain starting characteristic;
adapting the engine to the characteristic of the vehicle;
reversal of the direction of movement.

The main variator 2 transmits the power to the main shaft 5 which is coupled to the sun gears of a collecting differential 6.

The engine 1 furthermore drives a steering variator 3 and a gear reduction 10. The power distributed by the steering variator 3 and the reduction 10 is, by means of the steering differential 11 transmitted to the intermediate shaft 4 which, via the gear reductions 8 and 9 is coupled to the ring gears of the collecting differentials 6l en 6r driving respectively the left 7l and the right 7r out-going main shafts. The steering variator 3, the reduction 10 and the steering differential have the following main functions:
steering of the vehicle when driving in the forward or backward direction;
turning of the vehicle around its own vertical axis.

As already mentioned the variators 2 and 3 are of the continuously variable drive belt transmission type, preferably with metallic V-belts working along the push principle.

The clutch 12 and the break 13 together form the reversal clutch group 14; this group makes a smooth movement possible both in the forward and in the backward direction. Dependent on the load conditions the main variator 2 (continuously variable drive belt transmission) creates a stepless variation of the transmission ratio, which gives a optimal adaptation of the engine under all circumstances. The power of the engine is distributed, via the main drive shaft 5 to the sun gears of the collecting differential 6 and further to the out-going shaft 7. In this situation the ring gears of the collecting differentials 6 are not driven; the steering variator 3 (continuously variable drive belt transmission) and the reduction 10 do not absorb power but rotate without load. The reduction gear 10 and the transmission ratio of the steering variator 3 are so chosen and controlled that the resulting out-going number of rotations of the ring gear of the steering differential 11 is zero (starting position of the variator).

In cornering the steering variator 3 and the reduction 10 are driven by the common out-going shaft of the engine 1; this opens the possibility to distribute the out-going power over both the drive components. The steering differential 11 allows the distributed power to be collected again and given off to the intermediate shaft 4. This distribution of power creates the possibility, in case the full engine power should be given off to the intermediate shaft 4 (situation turning) by the steering variator 3 to transmit only a part of that power; as a consequense this can be of smaller dimensions. Moreover this construction gives the possibility to have the steering variator 3 rotating constantly (situation driving straight forward or vehicle at stand still with idling engine) under no load condition, without however rotating the intermediate shaft 4. The rotating variator can be immediately loaded starting from the unloaded condition by altering the transmission ratio thereby creating the possibility of steering when driving but also from stand still. From the point of view of wear/lifetime it is very important that a change of the transmission ratio of the belt variator preferably takes place with rotating pulleys. Steering to the left or the right becomes possible by altering the transmission ratio from the starting position which at the same time is the middle position. Increasing respectively decreasing the transmission ratio of the steering variator from the middle position will create a decrease respectively an increase of the speed of the sun gear of the steering differential 11, which with unchanging speed of the planets-bearer results in a reversal of the speed of rotation of the ring gear of the steering differential 11 and of the intermediate shaft 4. Also in this case the direction of rotation and the speed of the intermediate shaft 4 and the main shaft 5 determine the magnitude and the direction of the equal but oppositely directed increase respectively decrease of the speed of the out-going shafts 7l and 7r.

When turning around its own axis the main variator 2 is out of function. The power of the engine is given off to the intermediate shaft 4 only via the steering variator 3, the reduction 10 and the steering differential 11; in turn the intermediate shaft 4 drives again the out-going shafts 7l and 7r via the collecting differential 6l and 6r.

In the following paragraph the system according to the prior art is compared with a system according to the invention. It will be shown that the construction according to the invention is not only the replacement of the well known control mechanisms by continuously variable drive belts transmissions but that this system also has outstanding advantages.

|    | characterizing functions | known system | system according to the invention |
|----|--------------------------|--------------|-----------------------------------|
| a. | full power always avialable: | no | yes |
| b. | minimum turning circle stepless dependent on speed: | no | yes |
| c. | stepless change of transmission ratio: | no | yes |
| d. | efficiency of the system: | reasonable | good |
| e. | optimal adaptation of the engine to the load: | reasonable | optimal |

| | characterizing functions | known system | system according to the invention |
|---|---|---|---|
| f. | range of variation: | limited | large |
| g. | steering comfort: | reasonable | good |

Observations with respect to the above given summary:

a: the system according to the invention creates the possibility that the engine can be kept practically always at the maximum rotational speed and can give off full power. Consequence: improvement of the capacity (acceleration) and mobility;

b,g: with decreasing driving speed in a curve the main drive according to a conventional system will switch down causing the turning radius to change step-wise (dependent on the transmission ratio change). Consequence: transmission shocks and limited steering comfort. The system according to the invention permits higher average speed in curves. Consequence: improvement of mobility and manoeuvrability.

a,d: optimal use of the engine is now possible, e,f: respect to the consumption in relation to the power and the number of revolutions. No shocks when changing gears and no interruption of the driving power in changing. Consequence: improvement in comfort when driving and operating and in lifetime.

The characterizing functions a, b, d and e show an advantage of the construction according to the invention which is not near at hand, by the combination of two stepless controllable devices of the described type.

The clutch 12 and the break 13 together form a reversal clutch group 14, which allows a smooth drive off according to a desired characteristic, both in the forward and in the backward direction. This reversal clutch group 14, consisting of a planetary gear system enables reversing the direction of rotation. When operating clutch 12 from the outside the planet group is blocked which means that the in-going shaft (coupled to the planet gear bearer) is directly coupled, via the clutch 12 with the out-going shaft (coupled to the sun gear and the primary pulley of the main variator 2). By operating a reverse break 13 causing the ring gear of the planetary group to be blocked, the out-going axis (sun gear and primary pulley) will reverse their direction of rotation.

Figure 2:
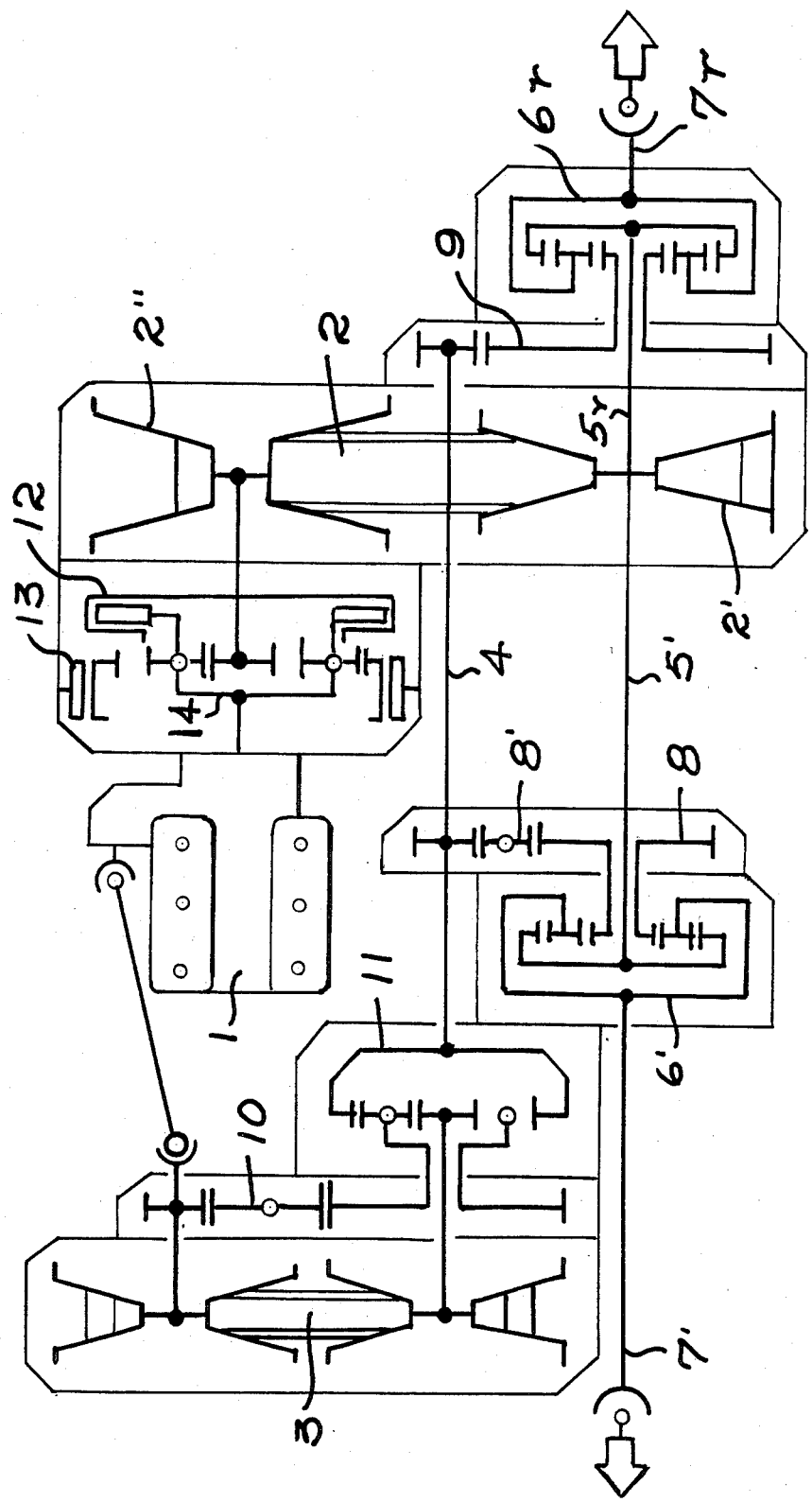
FIG. 2 is a schematic representation of a second embodiment of the transmission and steering system of the present invention.

It is observed that the collecting differentials (6l and 6r), the ring gears and the sun gears (5l and 5r) can, as far as their function is concerned, be interchanged as shown in FIG. 2 without leaving the scope of the invention.

We claim:

1. Two-sided drive for a cross-country vehicle provided with an engine and a variable main drive with reversal device coupled to two similar planetary gear units having sun gears and ring gears wherein:
   a. the planet carriers of said planetary gear units are coupled to the out-going shafts of the propulsion mechanism;
   b. said ring gears are coupled via an intermediate shaft and a gear transmission, which causes a rotational movement of said ring gears in opposite directions but with the same velocities, said intermediate shaft being rotatable clock-wise or counterclock-wise by a variable steering device which is driven by the engine;
   c. said sun gears have a common shaft which is coupled to the main drive;
   d. said common shaft of said sun gears carries a pulley of a continuously variable drive belt transmission;
   e. a second pulley of said continuously variable drive belt transmission is connected to the engine via a clutch or a brake and contains a reversal device; and
   f. a second variable drive belt transmission for steering is provided, said second variable drive belt transmission being coupled at one side with the engine and at the other side with said intermediate shaft via a differential.

2. Drive system according to claim 1 wherein said differential of the steering unit is also driven by a gear reduction on a shaft coupling the engine and the steering unit in such a manner that the power of the engine is distributed over said drive belt transmission for steering and said steering differential and united again at said intemediate shaft.

3. Drive system according to claim 1 wherein said variable drive belt transmission for steering, cooperating with said steering differential, realizes in substantially the middle position thereof a stationary position of said intermediate shaft.

4. Drive system according to claim 1 wherein said reversal device comprises a reversal clutch group which is provided with a planetary gear system with a drive-off clutch which can be operated from the outside and can block the planet group and with a brake which can be operated from the outside and can block the ring gear of the planet group.

5. Two-sided drive for a cross-country vehicle provided with an engine and variable main drive with reversal device coupled to two similar planetary gear units having sun gears and ring gears wherein:
   a. the planet carriers of said planetary gear units are coupled to the out-going shafts of the propulsion mechanism;
   b. said sun gears are coupled via an intermediate shaft and a gear transmission, which causes a rotational movement of said sun gears in opposite directions but with the same velocities, said intermediate shaft being rotatable clock-wise or counterclock-wise by a variable steering drive which is driven by the engine;
   c. said ring gears are drivingly coupled to a common shaft which is coupled to the main drive;
   d. said common shaft of said ring gears carries a pulley of a continuously variable drive belt transmission;
   e. a second pulley of said continuously variable drive belt transmission is connected to the engine via a clutch or a brake and contains a reversal device; and
   f. a second variable drive belt transmission for steering is provided, said second variable drive belt transmission being coupled at one side with the engine and at the other side with said intermediate shaft via a differential.

6. Drive system according to claim 5 wherein said differential of the steering unit is also driven by a gear reduction on a shaft coupling the engine and the steering unit in such a manner that the power of the engine is distributed over said drive belt transmission for steering and said steering differential and united again at said intermediate shaft.

7. Drive system according to claim 5 wherein said drive belt transmission for steering, cooperating with said steering differential, realizes in substantially the middle position thereof a stationary position of said intermediate shaft.

8. Drive system according to claim 5 wherein said reversal device comprises a reversal clutch group provided with a planetary gear system with a drive-off clutch which can be operated from the outside and can block the planet group and with a brake which can be operated from the outside and can block the ring gear of the planet group.

* * * * *

UNITED STATES PATENT OFFICE
CERTIFICATE OF CORRECTION

Patent No. 4,685,353                    Dated    August 11, 1987

Inventor(s)  Theodorus P.M. Cadee et al

It is certified that error appears in the above-identified patent and that said Letters Patent are hereby corrected as shown below:

In the heading in column 1, line [73], after "Assignee:",

"Octrooibureau Zuid" should read

--Van Doorne's Transmissie B.V. and
B.V. Machinebouw Conrad-Stork--

Signed and Sealed this

Seventh Day of March, 1989

*Attest:*

DONALD J. QUIGG

*Attesting Officer*                    *Commissioner of Patents and Trademarks*